United States Patent

San Giacomo, Jr. et al.

(10) Patent No.: US 12,467,492 B2
(45) Date of Patent: Nov. 11, 2025

(54) LOCKABLE SAFETY TURNBUCKLE

(71) Applicants: John Thomas San Giacomo, Jr., Blairstown, NJ (US); Keith Edward Lindemann, Punta Gorda, FL (US)

(72) Inventors: John Thomas San Giacomo, Jr., Blairstown, NJ (US); Keith Edward Lindemann, Punta Gorda, FL (US)

( * ) Notice: Subject to any disclaimer, the term of this patent is extended or adjusted under 35 U.S.C. 154(b) by 166 days.

(21) Appl. No.: 18/210,300

(22) Filed: Jun. 15, 2023

(65) Prior Publication Data

US 2024/0418190 A1 Dec. 19, 2024

(51) Int. Cl.
*F16B 7/06* (2006.01)
*F16B 7/04* (2006.01)
*F16G 11/12* (2006.01)

(52) U.S. Cl.
CPC ............... *F16B 7/06* (2013.01); *F16B 7/042* (2013.01); *F16G 11/12* (2013.01); *Y10T 403/291* (2015.01)

(58) Field of Classification Search
CPC .......... F16B 7/0406; F16B 7/042; F16B 7/06; F16B 7/105; F16G 11/12; Y10T 403/29; Y10T 403/291; Y10T 403/293; Y10T 403/295; Y10T 403/32508; Y10T 403/32549; Y10T 403/7081; Y10T 403/7084; Y10T 403/7088
USPC ........................................ 403/315, 316, 317
See application file for complete search history.

(56) References Cited

U.S. PATENT DOCUMENTS

| 1,286,701 | A | * | 12/1918 | Mathias | ................... | F16G 11/12 |
| | | | | | | 403/46 |
| 1,305,359 | A | * | 6/1919 | Hinderman | .............. | F16G 11/12 |
| | | | | | | 403/44 |
| 2,295,357 | A | | 9/1942 | Ryan et al. | | |
| 2,395,546 | A | * | 2/1946 | Harrington | .............. | F16G 11/12 |
| | | | | | | 403/46 |
| 2,412,566 | A | | 12/1946 | DeBell et al. | | |
| 2,479,096 | A | | 8/1949 | Bratz | | |

(Continued)

FOREIGN PATENT DOCUMENTS

| DE | 1194646 B | * | 6/1965 | ............ F16B 7/0406 |
| FR | 2205152 A5 | * | 5/1974 | .............. F16G 11/12 |

OTHER PUBLICATIONS

Aircraft Rigging and Biplane Assembly and Rigging; Aeronautics Guide; Mar. 13, 2023; pp. 1-25; https://www.aircraftsystemstech.com/p/aircraft-rigging-aircraft-rigging.html.

*Primary Examiner* — Amber R Anderson
*Assistant Examiner* — Kevin J Baynes
(74) *Attorney, Agent, or Firm* — Ernest D. Buff & Associates, LLC; Ernest D. Buff

(57) ABSTRACT

A lockable safety turnbuckle with a tensioning/compressing device is subjected to an axial tension/compression force to bind, moor, or connect two objects. The device has locking sleeves that allow the device to be unlocked, set, and locked to a desired tension/compression simultaneously. Unlocking the device increases its ability to handle non-axial or lateral loads when binding, mooring, or connecting objects. Locking sleeves not only lock the device from turning, but additionally provide support, stiffness, and stability that bridge the gap between the device's body and the rod ends. This, in turn, allows the turnbuckle to handle increased non-axial, radial or lateral loads. The turnbuckle resists bending or buckling due to the presence of lateral loads, and (Continued)

is safer and more reliable in operation than conventional designs.

10 Claims, 5 Drawing Sheets

(56) References Cited

U.S. PATENT DOCUMENTS

| | | | | | |
|---|---|---|---|---|---|
| 2,479,172 | A | * | 8/1949 | Landon | F16G 11/12 403/46 |
| 2,484,360 | A | * | 10/1949 | Toorans | F16G 11/12 403/46 |
| 2,512,501 | A | | 6/1950 | Miller | |
| 2,580,482 | A | * | 1/1952 | Stukenborg | F16G 11/12 411/218 |
| 2,609,220 | A | | 9/1952 | Spielman | |
| 2,671,681 | A | * | 3/1954 | Wille | B64C 3/00 403/46 |
| 2,790,658 | A | * | 4/1957 | Robinson | F16G 11/12 403/44 |
| 2,843,407 | A | * | 7/1958 | Stukenborg | B64C 3/00 403/46 |
| 2,843,408 | A | * | 7/1958 | Stukenborg | F16B 7/06 403/46 |
| 2,845,288 | A | | 7/1958 | Cierpik, Jr. | |
| 2,878,044 | A | | 3/1959 | Estes | |
| 2,903,283 | A | * | 9/1959 | Sweetland | F16G 11/12 403/44 |
| 2,913,267 | A | * | 11/1959 | Johnson, Jr. | F16G 11/12 403/46 |
| 3,278,210 | A | | 10/1966 | Sanders | |
| 3,806,265 | A | * | 4/1974 | Hattan | F16G 11/12 403/46 |
| 3,851,978 | A | * | 12/1974 | Kuipers | F16B 7/06 403/45 |
| 4,025,207 | A | * | 5/1977 | Johnson, Jr. | F16G 11/12 403/103 |
| 4,778,194 | A | * | 10/1988 | Koch | F16C 7/06 403/46 |
| 5,156,482 | A | * | 10/1992 | Owings | F16G 11/12 403/46 |
| 5,259,821 | A | * | 11/1993 | Bryant | F16H 7/14 52/118 |
| 7,032,871 | B1 | * | 4/2006 | Akrep | F16B 7/105 248/323 |
| 7,237,977 | B2 | * | 7/2007 | Kay | F16G 11/12 403/45 |
| 2023/0049274 | A1 | * | 2/2023 | Conner, Jr. | F16G 11/12 |

* cited by examiner

CIRCULAR CROSS-SECTIONAL AREA $D = .9184"$ $$AREA = \frac{\pi D^2}{4} = \frac{3.1416(.9184^2)}{4} = \frac{2.6498}{4} = .6624 \text{ in}^2$$

$$I_c = \frac{\pi D^4}{64} = \frac{3.1416(.9184^4)}{64} = \frac{2.235}{64} = .0349 \text{ in}^4$$

AREA = AREA (in$^2$)

$I_c$ = SECOND MOMENT OF INERTIA (in4)

SAME CROSS-SECTIONAL AREA

SQUARE HOLLOW CROSS-SECTIONAL AREA

OUTER SQUARE b&h=1.5"
INNER SQUARE b&h=1.26"

OUTER SQUARE − INNER SQUARE
$$AREA = b(h) - b(h) = 1.5(1.5) - 1.26(1.26) = 2.25 - 1.5876 = .6624 \text{ in}^2$$

OUTER SQUARE − INNER SQUARE
$$I_c = \frac{bh^3}{12} - \frac{bh^3}{12} = \frac{1.5(1.5^3)}{12} - \frac{1.26(1.26^3)}{12} = \frac{5.0625}{12} - \frac{2.5205}{12}$$

OUTER SQUARE − INNER SQUARE
$$I_c = .4219 - .21 = .2119 \text{ in}^4$$

RESISTANCE TO BENDING BASED ON SECOND MOMENT OF INERTIA (RATIO) = $\frac{.2119}{.0349}$ = 6.07 TIMES

FIG. 5

LOCKABLE SAFETY TURNBUCKLE

BACKGROUND OF THE INVENTION

1. Field of the Invention

The invention relates to turnbuckles and, more particularly, to lockable safety turnbuckles used for handling non-axial or lateral loads in binding, mooring, or interconnecting applications.

2. Description of the Prior Art

Turnbuckles are conventionally used in construction, marine and boating, and applications such as the rigging of stages. In addition, they may also be used in sports, such as wrestling or professional wrestling, to secure the ropes around the ring.

A turnbuckle is typically used for adjusting tension or a length of a cable or rope such as a wire rope. A typical turnbuckle includes a hook or jaw at one end and an eye bolt attached to another end of an elongated shaft-like central body. The elongated central body is adapted to be rotated using a wrench or pliers. The hook or jaw part of the turnbuckle is attached to the cable or rope that needs tightening or loosening, and the turnbuckle is rotated from the other end to adjust the length or the tension in the cable. Another common use for turnbuckles is for positioning adjustment. On ski lifts and cable car gondolas, they are used to position guide rails that align the swaying cable cars into their final position when incoming to their unload/loading stations. also used in concrete forms for fine position adjustment of the form panels for walls, footings, and floors to contain the concrete as it cures. These types of applications require the turnbuckles to predominantly take compression loads.

A lockable safety turnbuckle provides an extra level of safety and security in applications where the turnbuckle is subjected to significant forces or vibrations. This type of turnbuckle contains a locking mechanism to prevent the turnbuckle from loosening or unwinding due to vibrations or other external forces. It includes a locking collar that prevents the turnbuckle from rotating once it has been tightened to the rope. Lockable safety turnbuckles offer several advantages over standard turnbuckles, such as increased safety, greater security, better durability, increased versatility and ease of operation.

U.S. Pat. No. 3,278,210A discloses a self-locking turnbuckle. In this device, the locking means is manually manipulated without the use of special tools and requires no openings in the turnbuckle shaft(s) for locking means such as a pin. This feature makes the turnbuckle light in weight. The locking means in this turnbuckle includes an external sleeve having internal threads engaging corresponding external threads on the body of the turnbuckle. The sleeve has an inwardly turned flange at its outer end, which abuts upon a cylindrical enlargement on the shaft of the turnbuckle, which is retained within the sleeve between the flange and the end of the turnbuckle body.

U.S. Pat. No. 2,609,220 discloses a device for safely locking aircraft turnbuckles without using a wire. It aims to provide a maximum number of lock points to allow fine adjustment of the turnbuckle assembly.

Conventional turnbuckles are designed to be lightweight while their ability to adjust the tension in cables remains constant. Such conventional turnbuckles comprise locking means having a threaded sleeve structure that engages with corresponding threads on the turnbuckle body. These threads get rusted and wear out with time.

Further, the ability of conventional turnbuckles used for connecting two objects decreases when handling radial or lateral loads. This is especially prevalent when the length of the turnbuckle being used increases. In such cases, exposure to lateral loads can lead to bending or buckling of the turnbuckle.

There accordingly exists a need for a turnbuckle that is capable of providing utmost support, stiffness, and stability to effectively handle non-axial, radial or lateral loads.

SUMMARY

The present invention provides a lockable safety turnbuckle that is especially well-suited for handling non-axial or lateral loads in binding, mooring, or interconnecting applications.

The turnbuckle of the present invention can be advantageously used to subject an axial tension/compression force to bind, moor, or connect two objects. Generally stated, the turnbuckle of the present invention includes locking sleeves that allow setting, locking, and unlocking of the turnbuckle to a desired tension/compression simultaneously. In its locked state, the turnbuckle provides an increased ability to handle non-axial or lateral loads in binding, mooring, or connecting applications.

The locking sleeves not only lock the device from turning/rotating but also provide support, stiffness, and stability that is required between the central body and its ends, allowing the turnbuckle of the present invention to handle much higher lateral loads than the conventional turnbuckles.

More specifically, there is provided in accordance with the present invention, a lockable safety turnbuckle comprising an elongated body having an internal threaded bore on each of its distal ends and receiving holes, a first connection rod and a second connection rod, each having a threaded end and a terminal end, respectively. The first connecting rod is adapted to be thread coupled to the body at one distal end, and the second connecting rod is adapted to be thread coupled to the body at another distal end through respective threaded ends. The first connection rod and the second connection rod are configured to extend out of or contract into the respective distal ends of the body simultaneously when the body is rotated in a given direction. A first locking sleeve is adapted to slide over the body from one distal end side of the body. A second locking sleeve of equal length is adapted to slide over the body from another distal end side of the body. The first and second locking sleeves have receiving holes, respectively. In a first configuration, with the sleeves positioned adjacent to one another and covering the body substantially from each end, the body is capable of rotating. In a second configuration, wherein the sleeves are slid apart from one another to cover the respective terminal ends of the first and the second connection rods, the body is locked.

In an embodiment, in the first configuration, a receiving hole of the first locking sleeve overlaps a receiving hole of the body, and a first lock pin is inserted into the holes. A receiving hole of the second locking sleeve overlaps a receiving hole of the body, and a second lock pin is inserted into first overlapping holes.

In an embodiment, in the second configuration, a receiving hole of the first locking sleeve overlaps a receiving hole of the terminal end, and the first lock pin is inserted into the holes. A receiving hole of the second locking sleeve overlaps a receiving hole of the terminal end, and the second lock pin is inserted into second overlapping holes.

In an embodiment, each of the first and the second lock pins are latched by a first pin clip and a second pin clip, respectively, wherein the first pin clip and the second pin clip are attached to the respective lock pins at one end.

In an embodiment, a first-pin lanyard couples the first-pin clip to the first sleeve, and a second-pin lanyard couples the second-pin clip to the second sleeve.

In an embodiment, an adjustment handle is pivoted at a point on the body and is adapted to be rotated to raise perpendicular to the turnbuckle or to a rest position, lengthwise to the turnbuckle to provide rotation to the body.

In an embodiment, attachment fittings are attached to the terminal ends.

In an embodiment, the attachment fitting comprises at least one of an eye fitting, a hook fitting, and a jaw fitting.

In an embodiment, the elongated body has a square cross-sectional area.

In an embodiment, the first and second rods have a solid circular cross-sectional area.

Additional aspects and advantages of the present disclosure will become apparent to those skilled in this art from the following detailed description, wherein only illustrative embodiments of the present disclosure are shown and described. The present disclosure is capable of other and different embodiments, and its several details are capable of modifications in various obvious respects, all without departing from the disclosure. Accordingly, the drawings, descriptions, and examples in this summary are intended for purposes of illustration only and are not intended to limit the scope of the present disclosure.

BRIEF DESCRIPTION OF THE DRAWINGS

The invention will be more fully understood, and further advantages will become apparent when reference is had to the following detailed description and the accompanying drawings, in which:

FIG. 5 illustrates the equations to calculate the second moment of inertia and areas of the round cross-sectional area shape and the square hollow cross-sectional area shape in accordance with one embodiment of the invention.

DETAILED DESCRIPTION

Figure 1:
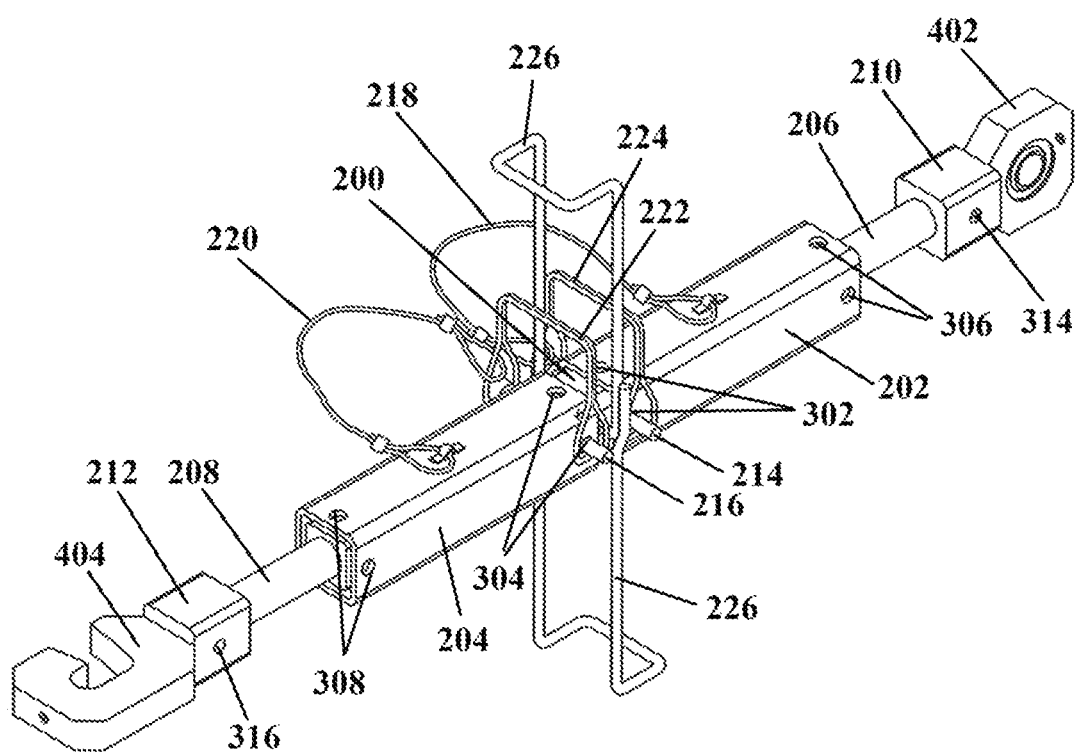
FIG. 1 illustrates a perspective view of the turnbuckle in a locked condition in a first configuration, in accordance with one embodiment of the invention.

The embodiments herein and the various features and advantageous details thereof are explained more fully with reference to the non-limiting embodiments that are illustrated in the accompanying drawings and the following description. Numerous variations, changes, and substitutions may occur to those skilled in the art without departing from the invention. It should be understood that various alternatives to the embodiments of the present disclosure herein may be employed.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

The term locking sleeve may also be referred to as strengthening sleeve throughout this specification.

Following reference numerals have been used to denote the respective part of the device throughout the specification:

| Reference numerals | Description |
| --- | --- |
| 200 | Body |
| 202 | First locking sleeve |
| 204 | Second locking sleeve |
| 206 | First connection rod (threaded rod) |
| 208 | Second connection rod (threaded rod) |
| 210 | Terminal end of the first connection rod |
| 212 | Terminal end of the second connection rod |
| 214 | First locking pin |
| 216 | Second locking pin |
| 218 | First pin lanyard |
| 220 | Second pin lanyard |
| 222 | First pin clip |
| 224 | Second pin clip |
| 226 | Adjustment handle |
| 302, 306 | Holes on first locking sleeve |
| 304, 308 | Holes on second locking sleeve |
| 310, 312 | Holes on body 200 |
| 314 | Hole on the terminal end of the first connection rod 206 |
| 316 | Hole on the terminal end of the second connection rod 208 |
| 402 | End fitting for connection rod 206 |
| 404 | End fitting for connection rod 208 |

The invention provides a turnbuckle of the type used to subject an axial tension/compression force to bind, moor, or connect two objects by means of a tensioning/compressing device; and, more particularly, to a lockable safety turnbuckle comprising locking sleeves that allow the device to be unlocked, set, and locked to a desired tension/compression simultaneously, and in the locked condition, the device increases the turnbuckle's ability to handle non-axial or lateral loads when binding, mooring, or connecting the objects.

Further, the locking/strengthening sleeves of the turnbuckle of the present invention, not only lock the device from turning, but additionally provide support, stiffness, and stability that bridges the weak gap between the body and the rod ends, allowing the turnbuckle to handle much higher lateral loads than a conventional turnbuckle.

In accordance with an embodiment of the invention, FIG. 1 shows a perspective view of the turnbuckle in a locked position, in accordance with the present invention. The turnbuckle comprises a body 200 having an internal threaded bore (not shown), wherein the body 200 comprises a polygon structure. In an embodiment, a first connection rod 206 and a second connection rod 208 are thread coupled to the body 200. The first connection rod 206 and the second connecting rod 208 are configured to extend out of distal ends of the body 200, simultaneously advancing the threaded bore for lengthening and shortening the turnbuckle. In an embodiment, each of the first and the second connection rods 206, 208 includes a terminal portion 210, 212 having a polygon structure, similar to the cross-section dimension of the body 200. In an embodiment, the turnbuckle includes a first locking sleeve 202 and a second locking sleeve 204 configured to slide on the body 200 into a first configuration and a second configuration, and vice-versa.

Figure 2:
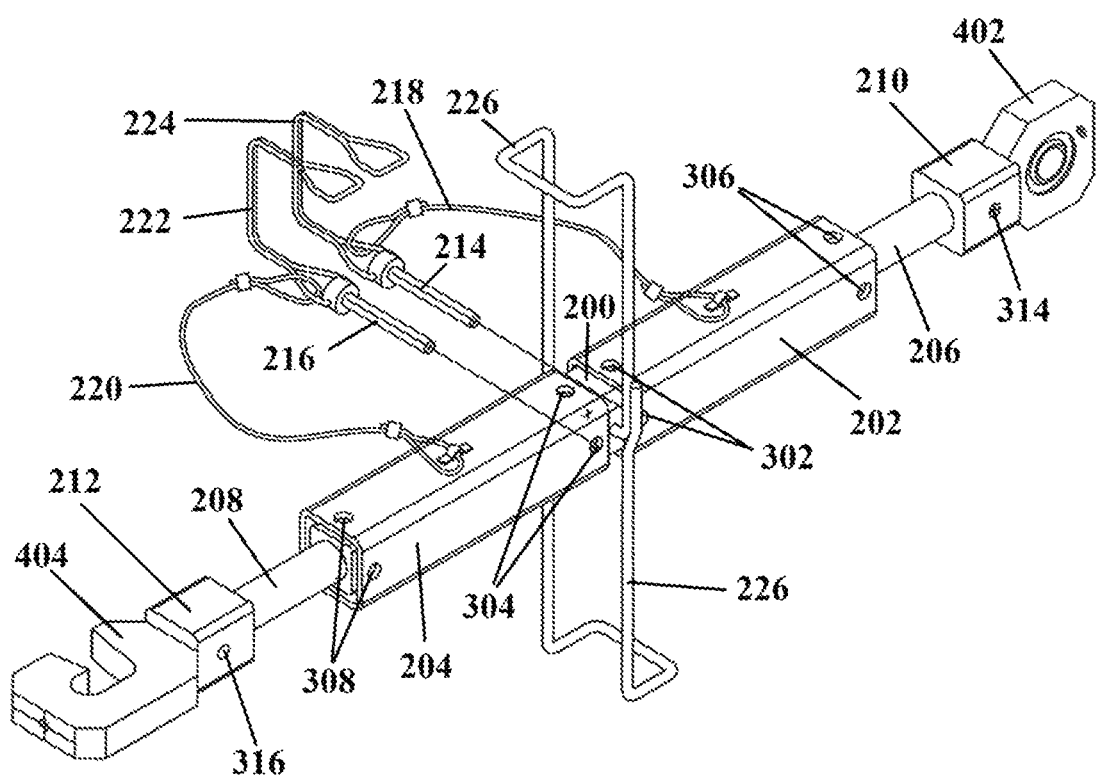
FIG. 2 illustrates a perspective view of the turnbuckle in an un-locked condition in the first configuration, in accordance with one embodiment of the invention.

The first configuration, as shown in FIG. 1 and FIG. 2, exists when the first locking sleeve 202 and the second locking sleeve 204 are positioned on the body 200, and where the body 200 is capable of rotating for simultaneous advancement of the first connection rods 204 and a second connecting rod 206 on the threaded bore of the body 200.

Figure 3:
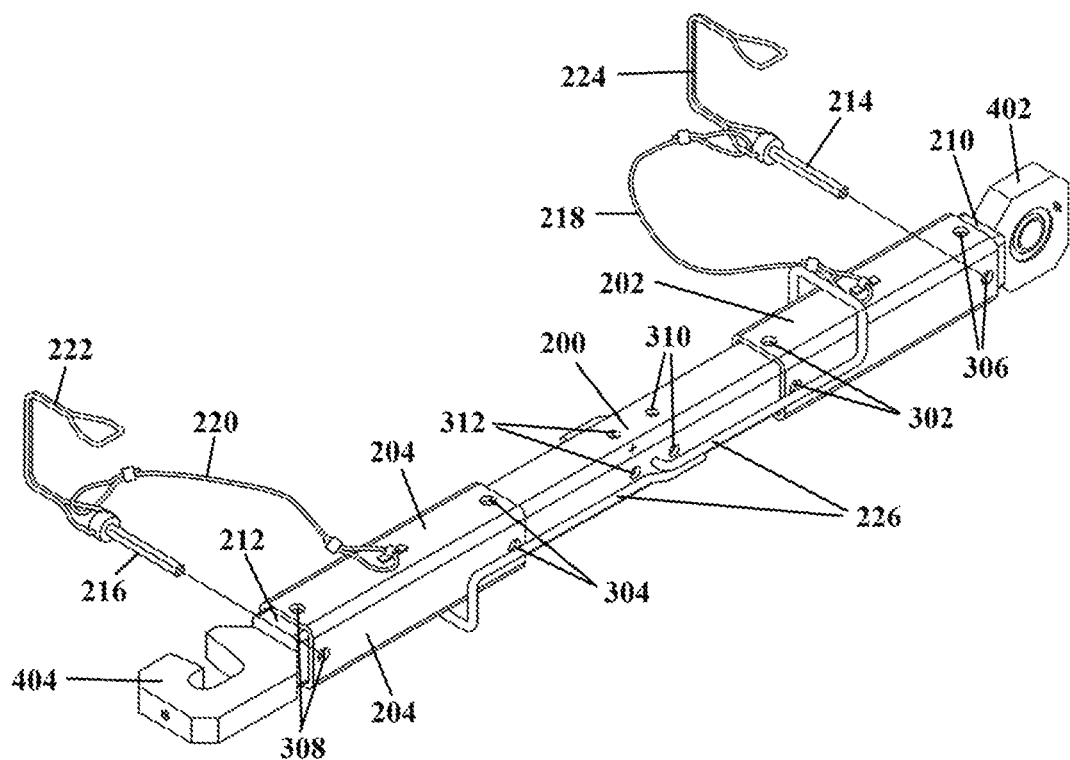
FIG. 3 illustrates a perspective view of the turnbuckle in the un-locked condition in the second configuration, in accordance with one embodiment of the invention.
Figure 4:
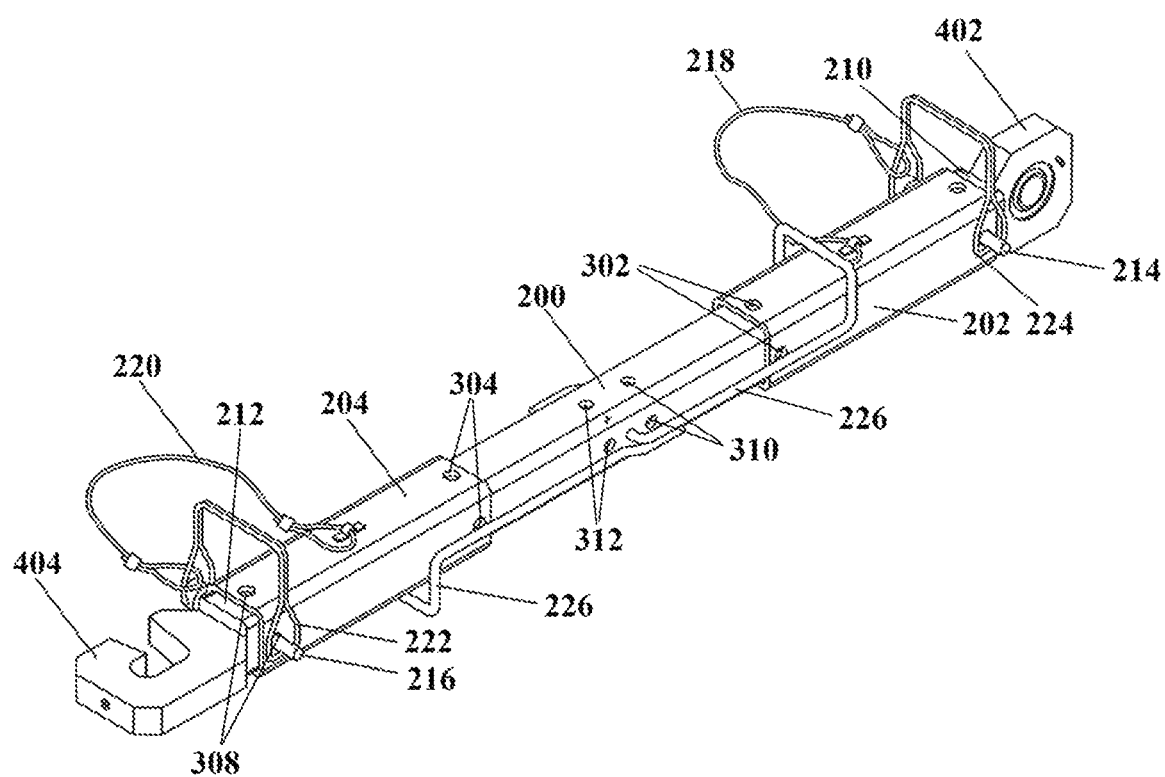
FIG. 4 illustrates a perspective view of the turnbuckle a locked condition in second configuration, in accordance with one embodiment of the invention.

The second configuration, which is shown in FIG. 3 and FIG. 4, exists when the first and the second locking sleeve 202, 204 overlap the terminal portion 210, 212 of each of the first and the second connection rod 206, 208 such that rotation of the body 200 is locked.

In an embodiment of the present invention, as shown in FIG. 1-4, the turnbuckle includes lock pins 214, 216 for locking the first and second locking sleeves 202, 204 in each configuration, wherein each of the locking sleeves 202, 204, body 200, and the terminal portion 210, 212 includes receiving holes 302, 304, 306, 308, 310, 312, 314, and 316.

In the first configuration, as shown in FIG. 1, the receiving holes 302 of the first locking sleeve 202 overlap the receiving holes 310 of the body 200, and a first lock pin 214 is inserted into overlapping holes 302, 310, and similarly, the receiving holes 304 of the second locking sleeve 204 overlaps the receiving holes 312 of the body 200, and a second lock pin 216 is inserted into overlapping holes 304, 312. This restrains the turnbuckle in the locked position to avoid movement of the first and the second sleeves 202, 204 in the first configuration.

In the second configuration, as shown in FIG. 4, the receiving holes 306 of the first locking sleeve 202 overlap the receiving holes 314 of the terminal end 210, and a first lock pin 214 is inserted into overlapping holes 306, 314, and similarly, the receiving holes 308 of the second locking sleeve 204 overlaps the receiving holes 316 of the terminal end 212, and a second lock pin 216 is inserted into overlapping holes 308, 316. This restrains the turnbuckle in a locked state to avoid movement of the first and the second sleeves 202, 204 in the second configuration.

In an embodiment of the present invention, as shown in FIG. 1-4, the turnbuckle further comprises a first pin clip 222 and a second pin clip 224, for latching each of the first and the second lock pins 214, 216. The pin clips 222, 224 are attached to the respective lock pins 214, 216 at one end.

In an embodiment of the present invention, the turnbuckle further comprises a first and a second pin lanyard 218, 220, attached on one end to the first and the second pin clips 222, 224, with the other end attached to the sleeves 202, 204 respectively, linking them together. The first and the second pin lanyard 218, 220 holds the respective lock pins 214, 216 closer to the turnbuckle to avoid accidental loss of the lock pins 214, 216, and to ensure that the items remain affixed to the turnbuckle.

In an embodiment of the present invention, the first connection rod 206 and the second connection rod 208 may in include an end fitting 402, 404 for connection rods 206, 208, attached after the terminal ends 210, 212 of the connection rods 206, 208. As shown in FIG. 1-4, the end fitting 402 is an eye type, whereas end fitting 404 is a hook type. The eye type end fitting 402, being a closed loop, can be connected to a shackle or quick link, whereas the hook type end fitting 404 can be used to create temporary connections as hook end fitting 404 can easily open and close to quickly connect and disconnect. In other embodiments, both the end fittings could be eye type used in applications such as for boat lifting.

In an embodiment of the present invention, the turnbuckle also includes at least one adjustment handle 226 configured for rotating the body 200 for the simultaneous advancement of the first connection rods 206 and the second connecting rod 208 on the threaded bore of the body 200 for lengthening and shortening of the turnbuckle. The adjustment handle 226 is pivoted at a point on the body and can be rotated to raise perpendicular to the turnbuckle or to a rest position, lengthwise to the turnbuckle.

According to the turnbuckle of the present invention, additional support, stiffness, and stability are provided that bridge the gap between the body 200 and the end fittings 402, 404, allowing the turnbuckle to handle much higher lateral loads than a conventional turnbuckle.

In accordance with an embodiment of the present invention, the turnbuckle is set by rotating the body 200 with the adjustment handle 226. The change in length is achieved through the means of a threaded coupling with a helical incline, which converts the rotary motion into a linear motion. On rotating the body 200 clockwise, the left-hand internal thread of the body 200 integrates with the left-hand external thread of the connection rod 206 and the right-hand internal thread of the body 200 integrates with the external right-hand thread of the connection rod 208. This phenomenon extends or increases the overall length, putting the turnbuckle in compression. Further, in the compressed condition, the turnbuckle operates stop pins on each external thread to prevent the device from disassembling or dismantling when setting. On rotating the body 200 counterclockwise, the left-hand internal thread of the body 200 integrates with the left-hand external thread of the connection rod 206, and the right-hand internal thread of the body 200 integrates with the external right-hand thread of the connection rod 208. This phenomenon of the device retracts or decreases the overall length, putting the device in tension.

In accordance with an embodiment of the present invention, both the left-handed and right-handed threads have a common pitch, making the extension and retraction rates substantially the same.

In accordance with an embodiment of the present invention, when the turnbuckle reaches the desired length, tension, or compression, the device can be locked.

Setting of the turnbuckle, in accordance with the present invention, is described hereinafter with reference to FIG. 1-4.

Referring to FIG. 1, the turnbuckle is locked in the first configuration with the locking sleeves 202 and 204 resting on the body 200, and the lock pins 214, 216 are inserted into the holes 302, 304, 310, 312. The first and the second pin clips 222, 224 are latched on each of the first and the second lock pins 214, 216. The adjustment handle 226 is in risen orientation and can be used for rotation of the body 200 for simultaneous advancement of the first connection rods 206 and the second connecting rod 208 on the threaded bore of the body 200 for lengthening and shortening of the turnbuckle. As shown in FIG. 1, the first connection rod 206 and the second connecting rod 208 have already been lengthened to the required distance.

Referring to FIG. 2, an intermediate position is shown with the turnbuckle in the first configuration in an un-locked condition. The lock pins 214, 216 which were inserted into holes 302, 304, 310, 312, as shown in FIG. 1, are first unlatched using the pin clips 222, 224 and then removed out of the holes 302, 304, 310, 312. As shown in FIG. 2. The pin clips 222, 224 are in the unlatched condition and the lock pins 214, 216 are removed out of the holes 302, 304, 310, 312. In this un-locked condition, with the removal of the lock pins 214, 216, the first and the second locking sleeves 202 and 204 are free to slide on the body 200.

Referring to FIG. 3, an intermediate position is shown with the turnbuckle in the second configuration in an unlocked condition. This second configuration is achieved when the locking sleeves slide from the body 200 over to the terminal ends 210, 212 of the connection rods 206, 208, such that the holes 306 of the first locking sleeve 202 overlap the holes 314 of the terminal 210 of the first connection rod 206, and the holes 308 of the second locking sleeve 204 overlap the holes 316 of the terminal 212 of the second connection rod 208.

Further, while sliding the locking sleeves 202, 204 towards an extended position, where the locking sleeves 202, 204 receive the terminal ends 210, 212 of the connection rods 206, 208, the body 200 may need to be rotated clockwise or counterclockwise slightly to align the polygon structure of the terminal ends 210, 212 of the connection rods 206, 208 with a receiving end of the locking sleeves 202, 204. This arrangement assists the polygon shapes to couple and lock the device into its final overall position or condition.

In this configuration, the rotational movement of the body is completely locked. Further, as shown in the FIG. 3, the lock pins 214, 216 have pin clips 222, 224 in unlatched condition, and the lock pins 214, 216 are aligned with the holes 306, 308 respectively. Further, as the first connection rods 206 and the second connecting rod 208 have already been lengthened to the required distance, the adjustment handle is no longer required to be used and is rotated to a rest position from the pivot point, lengthwise to the turnbuckle.

Referring to FIG. 4, a final position is shown with the turnbuckle in the second configuration in locked condition. As shown by FIG. 4, the locking sleeves 202, 206 have already slid over the terminal ends 210, 212 of the connection rods 206, 208, such that the holes 306 of the first locking sleeve 202 overlap the holes 314 of the terminal 210 of the first connection rod 206, and the holes 308 of the second locking sleeve 204 overlap the holes 316 of the terminal 212 of the second connection rod 208. The locking sleeves 202, 206 are further locked by inserting the lock pins 214, 216 in respective holes 306, 314 and 308, 316 respectively. The lock pins 214, 216 are further latched using the pin clips 222, 224 in the final position to avoid the accidental removal of the lock pins 214, 216.

Turnbuckle components and their interaction are designed to afford increased strength. The design of the turnbuckle components and their interaction is described hereinafter.

The turnbuckle, as discussed above, comprises the body 200 and two opposite threaded adjustable rods, 206 and 208. The threaded rods 206 and 208 have a solid circular cross-sectional area. When evaluating the ability to resist bending based on cross-sectional area, a solid circular cross-sectional area shape is less resistant to bending than a square hollow cross-sectional area shape. By sliding the locking sleeves 202, 204 over the square cross-sectional area of the locking surfaces of the turnbuckle terminal ends 210, 212 of the connection rods 206, 208, the square, hollow cross-section of the locking sleeves 202, 204 spans the gap of the threaded rods, solid circular cross-sectional area shape, and converts the entire length from square shoulder locking surface 210 of the terminal end 402 of the first connection rod 206 to the square shoulder locking surface 212 of the terminal end 404 of the second connection rod 208 into one continuous square hollow cross-sectional beam.

Another embodiment of the present invention discloses that, in construction, the locking sleeves 202, 204 slide over the body 200 and the terminal end 402, 404 of the first and the second connection rod 206, 208 with a radial tolerance in the gap between the two being approximately 0.005" or 0.13 mm. This fit allows the two members to slide over each other and still be close enough that when the device is subjected to a side or lateral load, the deflection caused by this load can now be transferred through and into the locking sleeves 202, 204.

In accordance with another embodiment, as depicted in FIG. 5 of the invention, applying the principles of mechanics, the second moment of inertia, also known as the moment of inertia of a shape, which is directly related to the ability of that shape to resist bending. When comparing a circular cross-section area beam versus a hollow square tube cross-sectional area beam with the same cross-sectional area and the same material construction under the same loaded conditions, the hollow square cross-sectional beam can resist bending forces by up to six times more than a beam with a circular cross-section. When comparing the actual cross-sectional areas of the device, the hollow, square cross-section has a higher cross-sectional area than the threaded shafts of the turnbuckles, making the resistance to bending greater than six times the cross-sectional shapes of equivalent areas.

In FIG. 5 there are illustrated equations that calculate the second moment of inertia and areas of the round cross-sectional area shape and the square hollow cross-sectional area shape. The comparison calculations use shapes with equal areas to show the difference in the second moment of inertia between the shapes.

In accordance with another embodiment, in assembly, the sleeves couple to the attachment end, which, when positioned, are perpendicular to the threaded axis when aligned, mating/integrating cross holes that accept lock pins 214, 216. The lock pins 214, 216 can be removed from the aligned integrating cross holes to unlock and reposition the desired length or load.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall there within.

Having thus described the invention in rather full detail, it will be understood that such detail need not be strictly adhered to, but that additional changes and modifications may suggest themselves to one skilled in the art, all falling within the scope of the invention as defined by the subjoined claims.

We claim:

1. A lockable safety turnbuckle comprising:
an elongated body (200) having first and second receiving holes (310, 312), the elongated body extending between a first distal end and a second distal end, wherein each distal end comprises an internally threaded bore;
a first connection rod (206) and a second connection rod (208), each having a threaded end and a terminal end (210, 212), respectively,
the first connection rod (206) adapted to be threaded coupled to the elongated body (200) at the first distal end and the second connection rod (208) adapted to be thread coupled to the elongated body (200) at the second distal end through the respective threaded ends of the first and second connection rods, wherein the first connection rod (206) and the second connection rod (208) are configured to extend out of or contract into the respective distal ends of the elongated body (200), simultaneously, when the elongated body (200) is rotated in a given direction;
a first locking sleeve (202) adapted to slide over the elongated body (200) from the first distal end of the elongated body (200);
a second locking sleeve (204) of equal length to the first locking sleeve adapted to slide over the elongated body (200) from the second distal end of the elongated body (200), the first and second locking sleeves (202, 204) each having first and second receiving holes (302, 306, 304, 308), respectively,
wherein in a first configuration, the first and second locking sleeves (202, 204) are positioned adjacent to one another and covering the elongated body (200) substantially from each the first and second distal ends and the elongated body (200) is capable of rotating, and in a second configuration, the first and second locking sleeves (202, 204) are slid apart from one another to cover the respective terminal ends (210, 212) of the first and the second connection rods (206, 208) and the elongated body (200) is locked from rotating.

2. The lockable safety turnbuckle as claimed in claim 1, wherein in the first configuration, the first receiving hole (302) of the first locking sleeve (202) overlaps the first receiving hole (310) of the elongated body (200) and a first lock pin (214) is inserted into the respective overlapping receiving holes (302, 310) of the first locking sleeve and the elongated body, and wherein, the first receiving hole (304) of the second locking sleeve (204) overlaps the second receiving hole (312) of the elongated body (200), and a second lock pin (216) is inserted into the respective overlapping receiving holes (304, 312) of the second locking sleeve and the elongated body.

3. The lockable safety turnbuckle as claimed in claim 2, wherein in the second configuration, the second receiving hole (306) of the first locking sleeve (202) overlaps a receiving hole (314) of the terminal end (210) of the first connection rod and the first lock pin (214) is inserted into the respective overlapping receiving holes (306, 314) of the first locking sleeve and the terminal end of the first connection rod, and wherein, the second receiving hole (308) of the second locking sleeve (204) overlaps a receiving hole (316) of the terminal end (212) of the second connection rod and the second lock pin (216) is inserted into the respective overlapping receiving holes (308, 316) of the second locking sleeve and the terminal end of the second connection rod.

4. The lockable safety turnbuckle as claimed in claim 2, wherein each of the first and the second lock pins (214, 216) are latched by a first pin clip (224) and a second pin clip (222), respectively, wherein the first pin clip (224) and second pin clip (222) are attached to an end of the first and second lock pins (214, 216), respectively.

5. The lockable safety turnbuckle as claimed in claim 4, wherein a first pin lanyard (218) couples the first pin clip (224) to the first locking sleeve (202) and a second pin lanyard (220) couples the second pin clip (222) to the second locking sleeve (204).

6. The lockable safety turnbuckle as claimed in claim 1, comprising an adjustment handle (226) pivoted at a point on the elongated body, and adapted to be rotated to be raised perpendicular to the elongated body or to a rest position length wise to the elongated body, to provide rotation to the elongated body (200).

7. The lockable safety turnbuckle as claimed in claim 1, wherein attachment fittings (402, 404) are attached to the terminal ends (210, 212) of each of the first and second connection rods.

8. The lockable safety turnbuckle as claimed in claim 7, wherein the attachment fittings (402, 404) comprise at least one of an eye fitting, a hook fitting and a jaw fitting.

9. The lockable safety turnbuckle as claimed in claim 1, wherein the elongated body (200) has a square cross-section.

10. The lockable safety turnbuckle as claimed in claim 1, wherein the first and second connection rods each have a solid circular cross-sectional area.

* * * * *